(12) United States Patent
Westphal et al.

(10) Patent No.: US 11,682,064 B2
(45) Date of Patent: Jun. 20, 2023

(54) SYSTEMS AND METHODS FOR PROVIDING SIMULTANEOUS SHOPPING CARTS

(71) Applicant: W.W. Grainger, Inc., Lake Forest, IL (US)

(72) Inventors: Geoffry A. Westphal, Evanston, IL (US); Siddarth Subramaniam, Lake Forest, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 141 days.

(21) Appl. No.: 17/196,447

(22) Filed: Mar. 9, 2021

(65) Prior Publication Data

US 2021/0334880 A1 Oct. 28, 2021

Related U.S. Application Data

(60) Provisional application No. 62/994,350, filed on Mar. 25, 2020.

(51) Int. Cl.

| | |
|---|---|
| *G06Q 30/00* | (2023.01) |
| *G06Q 30/0601* | (2023.01) |
| *G06F 16/955* | (2019.01) |
| *G06F 16/9535* | (2019.01) |
| *G06F 3/0482* | (2013.01) |
| *G06F 16/9538* | (2019.01) |

(52) U.S. Cl.
CPC ....... *G06Q 30/0633* (2013.01); *G06F 3/0482* (2013.01); *G06F 16/9535* (2019.01); *G06F 16/9538* (2019.01); *G06F 16/9558* (2019.01); *G06Q 30/0625* (2013.01); *G06Q 30/0641* (2013.01); *G06Q 30/0631* (2013.01)

(58) Field of Classification Search
CPC ....................................................... G06Q 30/00
See application file for complete search history.

(56) References Cited

U.S. PATENT DOCUMENTS

| | | | |
|---|---|---|---|
| 6,266,649 B1 * | 7/2001 | Linden | G06Q 30/02 705/26.7 |
| 10,127,600 B2 * | 11/2018 | Kumar | G06Q 30/0633 |
| 2002/0194087 A1 * | 12/2002 | Spiegel | G06Q 30/0631 705/26.7 |
| 2014/0279248 A1 | 9/2014 | Westphal | |

(Continued)

OTHER PUBLICATIONS

SCOS User Guide, "Multiple carts feature overview", Spryker Documentation, dated Jul. 23, 2021 (Year: 2021).*

*Primary Examiner* — Mark A Fadok
(74) *Attorney, Agent, or Firm* — Greenberg Traurig, LLP (57) ABSTRACT

Purchase history data is used to automatically create links within a data repository between product sold via an electronic vendor system and a plurality of shopping carts. When a customer performs a search for product, the vendor system queries the data repository to retrieve the plurality of shopping carts that have been linked to the product that is associated within the data repository to the search request. A plurality of customer interface elements, each corresponding to a one of the plurality of shopping carts, is then presented as a result to the search query. A selection of a one of the customer interface elements causes the vendor system to add one or more of the product to the corresponding one of the plurality of shopping carts.

10 Claims, 6 Drawing Sheets

(56) References Cited

U.S. PATENT DOCUMENTS

| | | | |
|---|---|---|---|
| 2014/0351082 A1* | 11/2014 | Lowinger | G06Q 30/0633 |
| | | | 705/26.8 |
| 2016/0035005 A1* | 2/2016 | Kumar | G06Q 30/0633 |
| | | | 705/26.8 |
| 2016/0210674 A1* | 7/2016 | Allen | G06Q 30/0635 |
| 2021/0241341 A1* | 8/2021 | Sharnagat | G06Q 30/0603 |

* cited by examiner

SYSTEMS AND METHODS FOR PROVIDING SIMULTANEOUS SHOPPING CARTS

RELATED APPLICATION INFORMATION

This application claims the benefit of U.S. Application No. 62/994,350, filed on Mar. 25, 2020, the disclosure of which is incorporated herein by reference in its entirety.

BACKGROUND

Currently, e-commerce related websites, whether business to business (B2B) or business to consumer (B2C), provide methods for a customer to search and navigate inventory. In particular, e-commerce websites commonly provide a variety of search options, which allow customers to search for products in a corresponding variety of ways, including for example, keyword searching, searching using unique product identifiers (e.g., a catalog number, ordering number, inventory number, Stock Keeping Unit (SKU), etc.), model number searching, competitor model number searching, manufacturer name searching, and searching via selection guides. Additionally, prior art, e-commerce websites often provide ways to refine and/or filter existing search results, including refining or filtering based on product category, brand, price range, and/or any other appropriate criteria. An example of such an e-commerce website may be seen in US Publication No. 2014/0279248, the disclosure of which is incorporated herein by reference in its entirety.

Notably, once a customer has located the products and/or services desired for purchase (collectively and individually referenced herein as "products"), the customer will add that product to a shopping cart. However, that there is only a single shopping cart for use in this operation is seen to be a limitation. Similarly, that the number of places on a website from which product can be added to that single shopping cart is also seen to be a limitation.

SUMMARY

To address the problems associated with the assumption made on e-commerce sites that only one live shopping cart is needed at any given time, the following describes systems and method for providing simultaneous live shopping carts. In accordance with the descriptions that follow, it is contemplated that a customer, such as a home shopper, a corporate purchasing agent, or the like, may want to be simultaneously working with numerous shopping carts and not want to single-thread one shopping cart at a time. This disclosure additionally contemplates a customer being provided with the ability to select one or more shopping carts in which to place a product. Still further, this disclosure contemplates providing an "add-to-cart" step further up front in the purchasing process, for example during the keyword search step or bulk order pad ordering step, whereby a shopping cart need not be limited to being accessed from a product details page as is conventionally done in the art.

BRIEF DESCRIPTION OF THE DRAWINGS

For a better understanding of the present disclosure, reference may be had to various examples shown in the attached drawings.

FIG. 2 illustrates an example page of a prior art product search system that provides search results.

DETAILED DESCRIPTION

The following description of example methods and systems is not intended to limit the scope of the description to the precise form or forms detailed herein. Instead the following description is intended to be illustrative so that others may follow its teachings.

The following discloses systems and methods for providing multiple shopping carts. In general, the example systems and methods provide the customer with the ability to search for product and to add the located product to one or more of multiple, live shopping carts. To this end, a link is created between one or more of the multiple, live shopping carts and product. The link may be created based on historical information about and/or specifically related to a customer, including for example, data related to a customer's previous purchasing history, shipping history, payment history, personal organizational lists, product information about previously purchased products including parts listings, power ratings, brand information, compatibility information, and/or any other information that may be collected by and/or provided to an e-commerce website. Such links may be automatically created by the system and/or manually created and edited by a customer. Via the links, the existence of which may be indicted to a customer in the performance of a search for product, product can be easily added to a desired shopping cart without requiring the customer to, for example, first access a product detail page for that product.

While not required, the disclosed examples may use supply chain information not only to create a linkage between product and one or more shopping carts, but also to provide search refinement and/or filtering parameters for customers using the e-commerce website. For example, a customer may conduct an initial search, e.g. via keyword searching, searching using unique product identifiers (e.g., a catalog number, ordering number, inventory number, Stock-Keeping Unit (SKU), etc.), model number searching, competitor model number searching, manufacturer name searching, searching via selection guides, etc. The disclosed system then provides supply-chain search refinement parameters which allow customers to narrow search results to show only, for example (i) previously purchased product; (ii) product purchased on a particular date; (iii) product shipped to a particular address; (iv) product paid for using a particular payment method; (v) product compatible with a previously purchased product; (vi) replacement parts approved for use in association with a previously purchased product; (vii) product listed on a customer's personal organizational list; (viii) product associated with a particular client; (ix) product associated with a particular project; (x) product previously included in a one of multiple shopping carts; and/or any other suitable parameter.

The disclosed example systems and methods provide for a simplified customer interface to assist a customer in finding and/or selecting the correct, or most suitable, product and to purchase that product. It will be appreciated by one of ordinary skill in the art that there are numerous interface conventions to provide search refinement capabilities based on supply chain information. For instance, by way of example only, each of the supply-chain search refinement parameters may be displayed on a side-bar, a pop-up, a nested list, a map, and/or listed beside each search result. The customer may select and/or otherwise choose a narrowing supply-chain search refinement parameter, which causes the e-commerce website to only display search results that are related to the selected search parameter.

Figure 1:
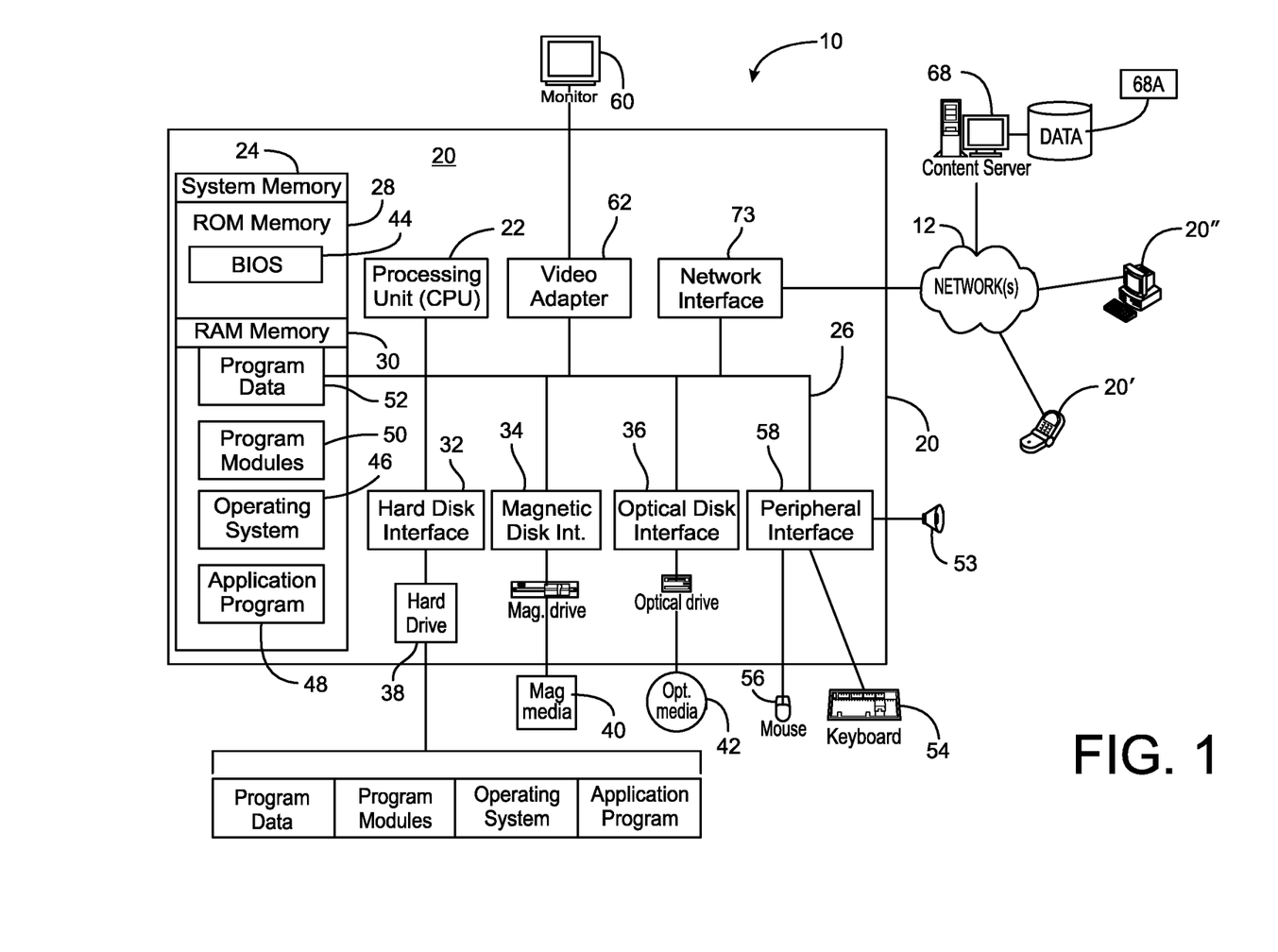
FIG. 1 illustrates in block diagram form components of an example, computer network environment suitable for implementing example cross referencing systems disclosed.

With reference to the figures, and more particularly, with reference to FIG. 1, the following discloses various example systems and methods for providing search results and facilitating the purchasing of product based on supply chain information on a computer network, such as a personal computer or mobile device. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a customer, client, corporate shopper, buyer, consumer, etc., to access a host system server 68 and, among other things, be connected to a hosted vendor purchasing system, e.g., a website, mobile application, etc. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, a mainframe computer, a personal-digital assistant ("PDA"), a cellular telephone, a mobile device, a tablet, an e-reader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices, including devices in the "cloud."

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules, and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a customer to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. The example data repository 68A may include any suitable vendor data including, for example, customer/company information, electronic catalog pages, inventor, etc. In this example, the data repository 68A includes a listing of a plurality of products that are available for purchase, and historical records related to a customer. A customer's historical records may include, for example, a customer's previous purchasing history, shipping history, payment history, searching history, personal organizational lists, product information about previously purchased products including parts listings, power ratings, brand information, compatibility information, prior created shopping carts, prior created shopping cart usage, and any other information that may be collected by an e-commerce website. In some instances, the customer related data may also include one or more proposed shopping carts, e.g., a shopping carts auto-generated as a function of historical data for a customer. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, systems related to geographical or mapping information, systems providing product information, etc.

For performing tasks as needed, the host system server 68 may include many or all of the elements described above relative to the processing device 20. In addition, the host system server 68 would generally include executable instructions for, among other things, storing contextual supply chain information, providing search refinement parameters related to supply chain information, facilitating the display and selection of supply chain search refinement parameters, providing access to product purchasing, etc.

Communications between the processing device 20 and the host system server 68 may be exchanged via a further processing device, such as a network router, that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

FIG. 2 illustrates a prior art webpage 200 demonstrating prior art search refinement parameters. In this webpage 200, a customer generally interacts with the host system server 68 to search for and order/purchase product of interest. To facilitate this process, the host system server 68 provides access to various product searching input methods, including, for example, a single product input, a bulk ordering pad, and/or a list importation method that is made conveniently accessible on a page, such as a mobile application page, webpage, etc. displayed on the client computing device. Specifically, as illustrated in the prior art example, the webpage 200 provides an access point 202 presented in the form of a text box, by which the customer may enter a search term, for example, a keyword, a unique product identifier (e.g., a catalog number, ordering number, inventory number, StockKeeping Unit (SKU), etc.), a model number, a manufacturer name, a competitor manufacture name, product guide selections etc. In the prior art example of webpage 200, a customer enters any suitable search term in access point 202 to initiate an initial search for product.

Upon the server 68 performing the initial search in the data repository 68A, the server 68 returns all matched and/or closely related search results to the window 204. For instance, in the example of FIG. 2, the search results are all related to coffee makers. The search results window 204 provides detailed information about each search result including, product name, manufacturer name, availability, price, product specifications, catalog location, and/or any other appropriate product information.

The prior art webpage 200 further allows customers to refine the initial search results based on certain parameters using the search refinement windows 206, 208, 210, 212. Specifically, in the illustrated example, the window 206 allows customers to refine the initial search results based on product category; the window 208 allows customers to refine the search results by brand; the window 210 allows customers to refine the search results by price range; and the window 212 allows customers to refine the search results by special features, (namely, clearance product, "green" product; new product, product from the online catalog, and product that are representative of supplier diversity).

Figure 3:
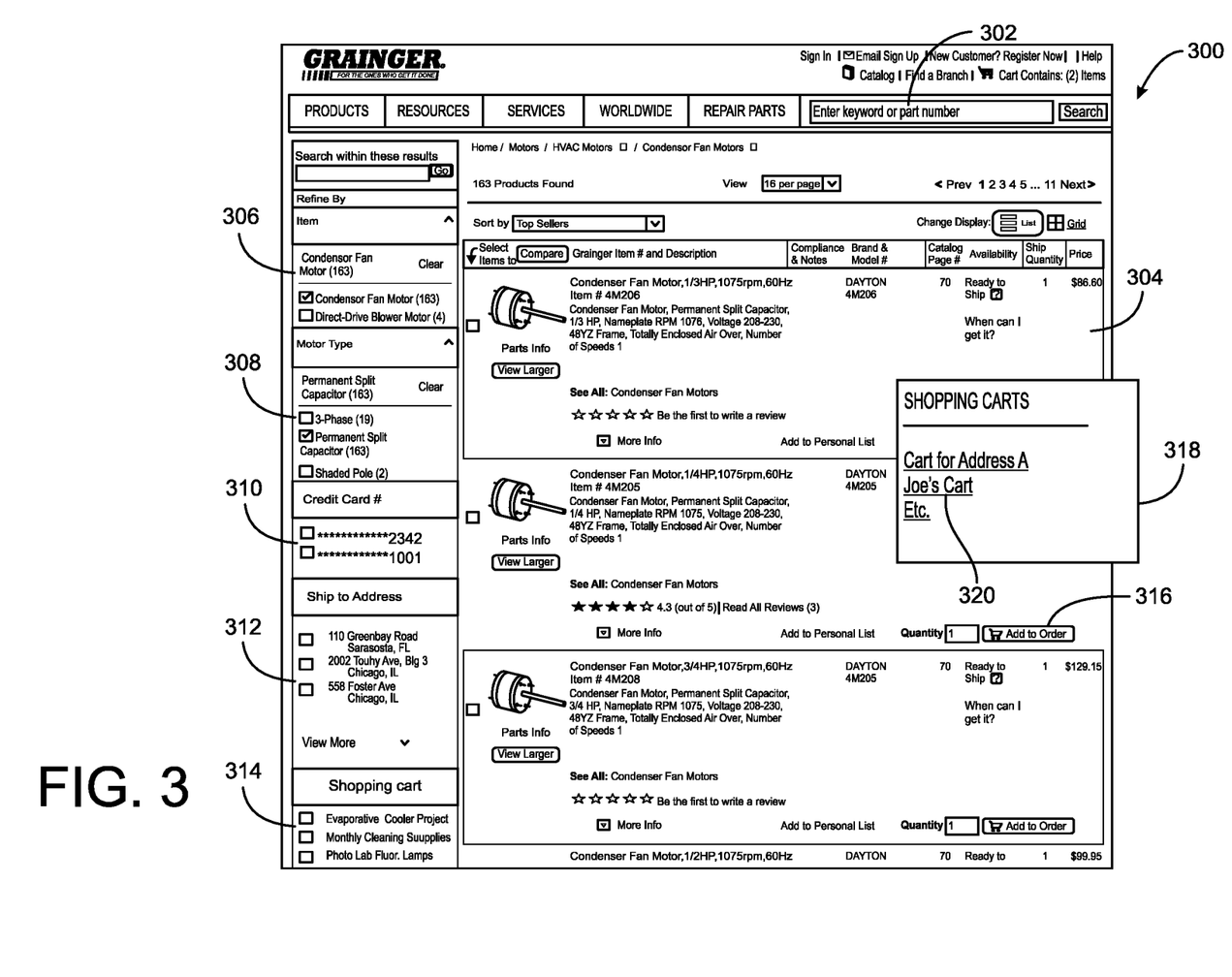
FIG. 3 illustrates an example page that provides search results and an add-to-cart feature that incorporates supply-chain information in accordance with the present disclosure.

FIG. 3 illustrates an example webpage 300 in accordance with the disclosed supply-chain search refinement framework 100. In the illustrated example of FIG. 3, a customer may enter any suitable initial search term in an access point 302. In the illustrated example of FIG. 3, the access point 302 is a text box, however, one of ordinary skill the art will recognize that the access point 302 may also be a hyperlink, radio button, check box, input field, drag-and-drop receptacle, and/or any other appropriate input mechanism. It will also be appreciated that the form, location, etc., of the access point 302 may vary as desired by design and/or by display type (e.g., mobile device, personal computer, tablet, etc.). Still further, the type and/or manner of inputting the order information may be any suitable entry method including text, voice, picture, scanner, motion, etc.

Triggering the initial search will cause the system host server 68 to look for product corresponding to the entered search in the data repository 68A and to return multiple matched and/or closely related product, i.e., product that has been linked to the search term(s) within the data repository 68A, as a search result to a window 304. It will be appreciated that the triggering event to perform the look-up of product in the data repository 68A may be caused by any suitable action, including for example, a change in the customer interface focus, an activation of the access point by being clicked on, moused over, touched, and/or otherwise selected, a time delay, a real-time look-up, near real-time look-up, and/or any other suitable event trigger.

The search result window 304 provides the customer with information related to each search result, including, product name, manufacturer name, availability, price, product specifications, catalog location, and/or any other appropriate product information. In this case, the search result the window 304 displays search results related to various motors. It will be appreciated that the system may provide any suitable product information including, for instance, a membership reward, a vendor product number, a discount, a manual, customer rating, compatibility information, energy rating, etc. Still further, the information provided in the search result window 204 may include links, pages, and/or other methods of providing additional information regarding the product as desired, such as a browse and/or other "look-up" button, a further pop-up, etc. In at least one example, the additional information causes the system 68 to redirect to a further page, including a page located within the vendor system 68 and/or a further page located within a system of a third party (e.g. another manufacturer). Such a page is commonly referred to as an item details page.

The example webpage 300 comprises search refinement windows, 306, 308, 310, 312, 314. In this example, the system utilizes some prior art search refinement parameters allowing customers to refine by product name, as shown in the window 306, and refine by motor type as shown in the window 308.

The example webpage 300 also includes supply-chain, customer-related search refinement parameters, as shown in windows 310, 312, and 314. A customer may use the window 310 to refine the search results to show product that was previously purchased using a certain credit card number. In particular, after a customer selects a certain credit card listed in the window 310, the system will display only the product that was previously purchased using the selected credit card. One of ordinary skill in the art will recognize that customers may use the credit card information to identify certain supply-chain information, such as information about the client that a product was previously purchased for, the department that the product was billed to, the budget that the product is a part of, and or any other appropriate supply chain information. In just one example, if a customer wishes to identify a replacement fan motor that was previously purchased for an existing client, the customer may use the window 310 to refine the search results so the system only displays fan motors that were previously purchased using that client's credit card. One of ordinary skill in the art will recognize that while the example window 310 only displays the last four digits of the credit card, a system in accordance with the present disclosure may display any additional information such as client name, department name, budget allocation, billing address, cost center number, department number, etc.

A customer may use the window 312 to refine the search results based upon shipping address. Here, after customer selects an address listed in the window 312, the system will display only the product that was previously purchased and shipped to the selected address. One of ordinary skill in the art will recognize that customers may use the displayed shipping addresses to identify certain supply chain information, such as the client that the product, department, project, site location, and/or machine assembly, for which the product was previously purchased. For example, if the customer of the webpage 300 wishes to locate a replacement fan motor for a fan motor that was previously purchased and used in a machine assembly at a first location, the customer may use the window 312 to refine the search results to only show fan motors that were previously purchased and shipped to the address of the first location. One of ordinary skill in the art will recognize that while the example window 312 only displays the shipping address, a system in accordance with the disclosed framework 100 may also display other related information such as building name, street name, city, zip code, phone number, client name, site name, machine assembly name, project name, etc.

A customer may use the window 314 to refine the search results to only show product that has been previously placed into a one of multiple shopping carts of a customer. Here, after a customer selects a shopping cart name displayed in the window 314, the framework 100 will display only the product that is associated with that shopping cart. In an example, selecting a shopping cart name will not only function to display the product that is associated with the selected shopping cart but will also automatically place the product into the selected shopping cart to thereby facilitate the purchasing of the product. The amount of product to be placed into the selected shopping cart may also be based on prior purchasing histories, e.g., the system may use a most recurring amount, the last amount used with this cart, an average amount over time for this cart (or considering other carts/customers), etc. As will be appreciated, the system may request permission from a customer before placing the product in the appropriate shopping cart and, once a product in placed in the shopping cart, the shopping cart can be edited by a customer as is conventional, e.g., the product can be removed and the quantity of product can be changed as desired.

While the example page 300 displays a number of supply-chain based search refinement parameters, one of ordinary skill in the art will recognize that the present disclosure is not limited to those supply-chain based search refinement parameters. For example, other supply-chain based search refinement parameters include, previously purchased product; product purchased on a particular date; product delivered via a particular method (e.g., pick up, delivery, freight, etc.); the name of customer/purchaser; product paid for using a particular payment method (e.g., check, money order, sales account, etc.); product compatible with a previously purchased product; replacement parts approved for use with a previously purchased product; product associated with a particular client; product associated with a particular project; etc. Moreover, one of ordinary skill in the art will recognize that a customer may use supply-chain search refinement parameters in a nested fashion, that is a supply-chain refinement parameter may be used after the search results are already refined using one or more refinement parameters (which may be supply-chain based, or non-supply chain based). Further, the framework 100 may only choose to display relevant supply chain refinement parameters. For example, if the initial search is refined by date range, framework 100 may only show the supply chain refinement parameters that are relevant to the selected date range (e.g., the framework may not show payment methods that were not used during the selected date range).

It will also be appreciated that such information may also be used to suggest a shopping cart to a customer and such suggested shopping cart may be used to refine a search as per the above. For example, the system may discern a recurring order to a given address, such as described in US 2016/0328779A1 and US 2014/0279188A, the disclosures of which are incorporated herein by reference in their entirety, and may auto-suggest a shopping cart with an auto-generated label, for example, order for location X occurring monthly. Selection of a user interface element indicative of an auto-suggested shopping cart would, as before, cause product within a search result to be auto-added to the appropriate shopping cart.

It will be understood that the filters can be selectively added to a search results page as a function of the product returned in a search result. For example, if no product returned in a search result has been placed into a shopping cart in the past, the product is not a product associated with an auto-suggested shopping cart, etc., no shopping cart filters need be provided.

Figure 4:
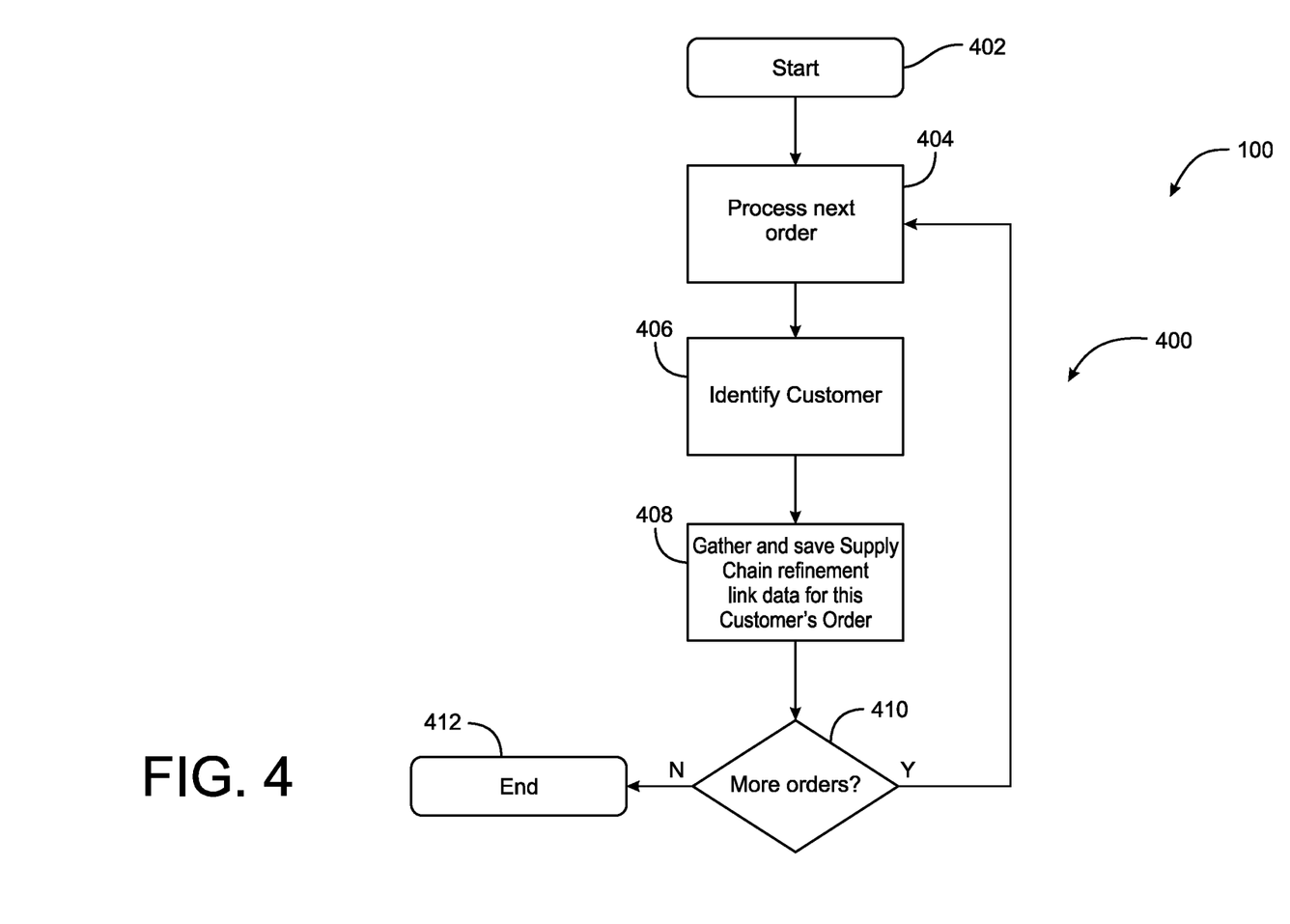
FIG. 4 illustrates in flow chart form a process for providing search results incorporating supply chain information in accordance with the present disclosure.

FIG. 4 is a flow chart that shows an example process 400 for collecting supply-chain information for use in developing supply-chain based search refinement and shopping cart creating parameters in accordance with the framework 100. As shown, the method is initiated at a block 402, for example, when a customer accesses an e-commerce website, a customer visits an organization's online catalog, a customer logs into a customer account, and/or any other appropriate triggering event. At a block 404 the framework 100 processes the next order, which may be, for example, a purchase order, e.g., placing product into a given shopping cart, an inventory stock check, and/or any other appropriate order. At a block 406 the framework 100 identifies the customer who is making the order processed at the block 404. At a block 408 the framework 100 gathers supply chain information related to the order processed in the block 404. The supply chain information may be any appropriate contextual information, including the data about the product ordered (e.g., name, model number, brand, compatibility, rating, price, sales discount, etc.), billing information, billing method, shipping information, delivery method, name of customer, name of project, customer notes, date of purchase, associated customer lists, associated shopping cart, etc. This information may be stored in the data repository 68A, or any other suitable location, with the relationships between the data, i.e., the links, being maintained, created, and modified as needed. For example, data relating to supply-chain based search refinement parameters may be stored in a centralized data repository, and/or such data may be stored locally, on a customer's system (i.e. via the customer's internet browser history, cookies etc.).

Next at block 410 the framework 100 determines whether the customer has additional orders. If the customer has additional orders, the data collection process 400 returns to the block 404 to process that order. If the customer does not have additional orders the data collection process ends 412.

In a further example, when a customer clicks on an "add to cart" icon 316 for a given product, whether provided in a search results page as illustrated in FIG. 3, a product details page, or the like without limitation, the system may cause a pop-up box 318 to be presented to the customer where the pop-up box 318 includes links 320 for allowing the customer to select one or more shopping carts in which to place the product that is associated with the selected "add to cart" icon. These shopping carts can be identified by several means, including but not limited to ship-to address, a shopping cart nick name, or the name of a person at the customer's location associated with the ship-to address (e.g., "Attn: <name>"). In this way, each unique desired ordering parameter can be associated with a unique shopping cart. The shopping carts, which as noted may be manually created and manually and/or automatically linked to product and/or automatically created and manually and/or automatically linked to product, may likewise be manually named and/or automatically named. Furthermore, when a product is added to a shopping cart, a default quantity for the product can be used, e.g., 1, most commonly purchased amount for all customers, most commonly purchased amount for this customer, etc., the web page may provide a quantity entry field associated with the "add to cart" icon by which a customer may manually provide a desired quantity, a further pop-up can be presented to a user, after a shopping cart has been selected, to likewise obtain from the customer a quantity number, or the like as desired.

Figure 5:
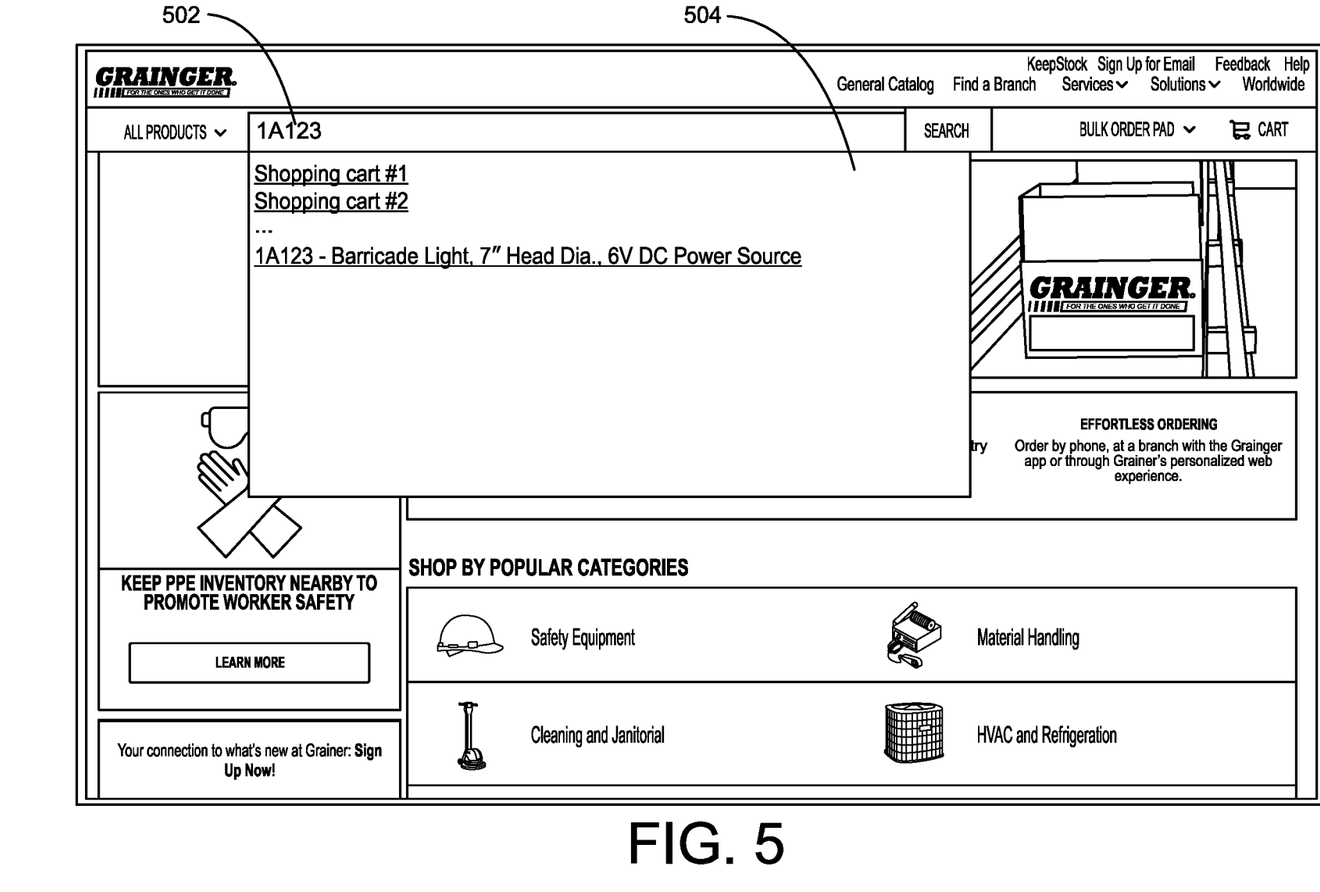
FIG. 5 illustrates an example page that provides an add-to-cart feature during a search process in accordance with the present disclosure.

In another example, in response to the performance of a keyword search during which a keyword is entered by a user in an access point, such as access point 502 shown in FIG. 5, an otherwise, conventionally provided, drop-down, search results suggestion box 504 can be augmented to provide suggestions for pre-used and/or pre-created shopping carts that have been linked to the product within the search results. For example, if a customer had previously purchased SKU 1A123, the first keyword suggestion(s) would be the shopping cart(s) that had previously been used to purchase that SKU (when that SKU is being searched for). From this suggestion box, provided during the keyword search process, that same product can be added to one or more shopping carts without having to go to any subsequent detail pages in the manner described previously. This website behavior would be similar for manufacturer numbers and competitor SKU numbers. While that customer would be able to quickly add product to one r more desired shopping carts in this manner, activating the product link "1A123" in the suggestion box 504 would, as is conventional, take the customer to the corresponding product detail page in the illustrated example.

Figure 6:
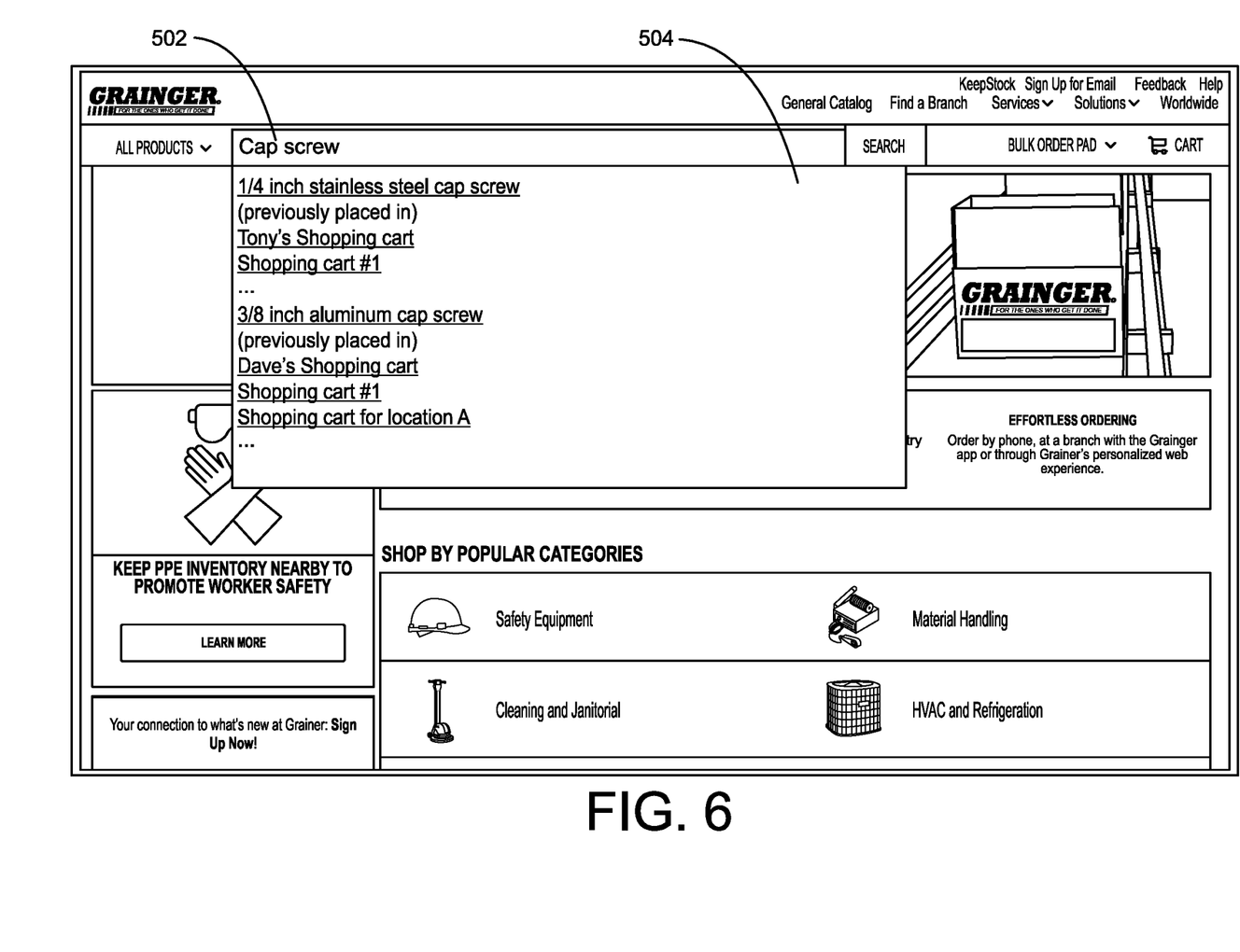
FIG. 6 illustrates a further example page that provides an add-to-cart feature during a search process in accordance with the present disclosure.

As noted above, the subject system may also provide a customer with the ability to use a keyword search to match on/locate product (the same or similar) that has been purchased using different shopping carts. In a further example of this aspect of the subject disclosure, if a customer searches for "cap screw" generally, for example by entering the search term in access point 502 as illustrated in FIG. 6, the keyword search drop-down suggestion box 504 could recommend the stainless steel ¼ inch cap screw previously purchased using the shopping cart associated with the name Tony. The customer could add that ¼ inch stainless steel cap screw to Tony's shopping cart (or another shopping cart) or could link to the product detail page for that product as previously described.

However, at the same time, with the same keyword search of just "cap screw", another shopping cart, at the same time, associated with David who works for (e.g., is associated with the identifier of) the same customer but at a different location than Tony, could be recommended to the searcher. The search engine knows that David also bought a cap screw but that David's cap screw was aluminum and ⅜ inch in size. The customer can decide whether to add the product in the search result into one or both of the shopping carts also included in the search result, e.g., to add the ¼ inch cap screw to Tony's shopping cart and/or to add the ⅜ inch cap screw to David's shopping cart. In other words, the search engine is adapted to search the descriptions of SKUs previously purchased by a customer but using different shopping carts and recommends shopping cart/SKU combinations to the customer. It will also be understood that the action of adding a product to a shopping cart would not cause the customer to be exited from the search result to thereby provide the customer with the opportunity to add product to multiple carts. To exit the search, the customer may select an appropriate user interface element to navigate to a product detail page, start a new search, exit to a shopping cart page, etc.

As is further apparent from the description above and as shown in FIG. 6, an "exact match" is not needed to recommend products to place in shopping carts. In a B2C setting, for example, a customer need only type in "paper towels" and can be recommended the paper towels they purchased before, without the need of remembering packing size or brand name. Other information could be included with the shopping cart recommendation, like price, brand, last purchase date, etc.

The availability of multiple shopping carts also has the advantage of providing simultaneous, online shopping. By way of example, the system can be used to holiday shop for several grandchildren. There could be a live shopping cart active for each grandchild. Each shopping cart would be persistent, too, until a check-out took place for any given grandchild's corresponding shopping cart. The labeled shopping carts could be stored for later reference as discussed above.

The same situation is true in B2B, where a purchasing agent maintains and fills multiple shopping carts all week and checks-out on Friday afternoon. Those shopping carts can be populated with a bulk order pad feature or through any other traditional add-to-cart buttons on the vendor's website.

Within the system, each shopping cart will be unique. Combinations of database fields can make the cart unique. For example, Ship-To-Address field+Attn: field; a unique nick name given to the cart by the customer; a piece of biometric information like a fingerprint or a face picture. Note that the ship-to-address can be complex—the street address can be the same but an office mail stop can be different, or the street address can be the same but the dock number can be different. Each shopping cart will have its own defaults, but will have the ability to be modified. For example, a shopping cart can have the ability to mark each product as taxable or not. A shopping cart can also be uniquely identified by the location in which the products end up at the customer site. For example, there can be a unique shopping cart which is used exclusively for a cleaning closet. Types of nick names can be stored: person, location (in a building), application/activity, ship-to address. Nick names can be filtered by type while "adding to cart".

It is also helpful if there is a picture on each shopping cart. The picture can be the mailing address, a picture of who ultimately receives the products in the order, or a picture of the location where the products end up (e.g., cleaning closet on the $4^{th}$ floor, greenhouse #2, etc.). These visual clues can help the customer placing the order select the proper shopping cart and help reduce the number of shipping errors.

Additional functionality is possible. Instead of having one large product index used in the same way for each customer, there can be millions of smaller product indexes. If the vendor system knows who the customer is (using cookies or having the customer logged in), only the indexes of the shopping carts associated with that customer can be initially used to search for product. This is because so many SKUs are reordered. Each shopping cart index is the aggregate sum of all SKUs that have been purchased using that shopping cart. This is how searching for "cap screw" can make search results accuracy so precise. Except for in rare cases, the vast majority of customers order a very limited number of unique SKUs. If the customer is not reordering a SKU, then the general product index is used, e.g., general search results would preferably follow the shopping cart specific search results, if any.

It will be appreciated that still more functionality is possible with unique shopping carts. If a customer is performing a visual search, the customer can take a picture of themselves simultaneously using the front-facing camera, or within a certain timeframe take two pictures, and the customer's face biometrics can direct the product to the proper shopping cart(s), provided the SKU is something that customer has purchased before. Notice that there can be more than one shopping cart associated with a person, regardless of how that person is identified. This is because a customer can have multiple ship-to addresses or multiple locations at one or more ship-to addresses. After taking a picture of the product, a list of shopping carts would be listed. Notices that a parallel of the "buy now/one-click" functionality can be implemented. Just take a picture of something you have bought before and the system will automatically ship that product using the shopping cart defaults that were on the customer's shopping cart.

Yet further, it is contemplated that the system can be used to allow multiple different users within an organization to fill plural, different organizational shopping carts whereupon a centralized purchasing entity/agent can review/edit/approve the shopping carts for ultimate purchase of the product placed therein.

In a further example, shopping carts may be differentiated by a shipping preference, e.g., overnight shipping, expedited shipping, standard ground shipping, and the like. The shipping preference shopping carts can be further associated with different ship-to addresses. In this manner, product can be automatically added to a one of plural, different shipping method shopping cart based on a sensed location of a user browsing product, for example, by using a GPS or location sensor associated with the browsing device. That is, if a customer is using a mobile device with sensors that determine a specific location that is associated with an overnight shipping cart, the overnight shipping shopping cart may be automatically used as the destination for any product of interest to the customer.

If a customer uses visual search to identify a product and that product meets a certain criteria (e.g., exact match, physical location where the photo was taken, or any combination of one or more criteria), that product can automatically be sent to an appropriate shopping cart that, for example, uses the proper shipping method and/or proper shipping address, billing department, etc. Similarly, shopping carts can be associated with product size. In this manner, product of a certain size (or size range) can be automatically added to a shopping cart associated with a shipping address such as a warehouse dock while product of another, smaller size (or size range) can be automatically added to a shopping cart associated with a shipping address such as a company mailroom.

In further examples, one or more of the shopping carts may have timers on them which, when the measured time expires or a predetermined time is reached, causes the system to automatically place an order for all the items in the shopping cart. That is, there may be shopping carts that place orders at the end of each week, or at the end or beginning of a month, for example. This reduces the number of shipments the customer will received, saying money for both the vendor and the customer.

In summary, while certain example methods and apparatus have been described herein, the scope of coverage of this patent is not limited thereto. On the contrary, this patent is intended to cover all methods, apparatus, and articles of manufacture fairly falling within the scope of the appended claims either literally or under the doctrine of equivalents.

What is claimed is:

1. A non-transient, computer readable media having stored thereon instructions for providing access to multiple shopping carts maintained within an electronic vendor system, the instructions performing steps comprising:

storing in a data repository a link between a product that was prior purchased by a customer of the electronic vendor system and a plurality of shopping carts associated with the customer of the electronic vendor system and into which the product that was prior purchased by the customer of the electronic vendor system was placed;

causing a page to be displayed on a client computing device, the page comprising a search access point in which a search term is enterable to perform a search query;

in response to an entering of the search term in the search access point by the customer that generates a search query result which includes the product that was prior purchased by the customer of the electronic vendor system, causing a plurality of customer interface elements, each corresponding to a one of the plurality of shopping carts that was prior linked to the product that was prior purchased by the customer of the electronic vendor system, to be presented on the client computing device; and in response to a selection of a one of the plurality of customer interface elements from the presented plurality of customer interface elements provided in connection with an indication of a desire to add the product that was prior purchased by the customer of the electronic vendor to the one of the plurality of shopping carts associated with the selected one of the plurality of customer interface elements, causing the electronic vendor system to add to the one of the plurality of shopping carts associated with the selected one of the plurality of customer interface elements one or more of the product that was prior purchased by the customer of the electronic vendor system.

2. The computer-readable media as recited in claim 1, wherein the data repository is located on a centralized server.

3. The computer-readable media as recited in claim 1, wherein at least one of the plurality of shopping carts is further linked to a customer specified location to which the product that was prior purchased by the customer of the electronic vendor system was shipped.

4. The computer-readable media as recited in claim 1, wherein at least one of the plurality of shopping carts is further linked to a customer specified task which utilizes the product that was prior purchased by the customer of the electronic vendor system.

5. The computer-readable media as recited in claim 1, wherein at least one of the plurality of shopping carts is further linked to a customer, specified organization name.

6. The computer-readable media as recited in claim 1, wherein the instructions use prior purchasing history data of the customer to further link at least one of the plurality of shopping carts with an automatically generated prior purchasing history related identifier that is to be displayed to the customer.

7. The computer-readable media as recited in claim 1, wherein in response to entering of the search term, the vendor system displays at least one further customer interface element for use in indicating the desire to add the product that was prior purchased by the customer of the electronic vendor to the one of the plurality of shopping carts associated with the selected one of the plurality of customer interface elements.

8. The computer-readable media as recited in claim 1, wherein the order access point is a text entry box.

9. The computer-readable media as recited in claim 1, wherein at least one of the plurality of shopping carts is further linked to a credit card used in connection with a prior purchasing of the product that was prior purchased by the customer of the electronic vendor system.

10. The computer-readable media as recited in claim 1, wherein the customer interface elements are presented in a portion of the displayed page.

* * * * *